United States Patent [19]

Tsunekawa et al.

[11] Patent Number: 5,708,862
[45] Date of Patent: Jan. 13, 1998

[54] GAZING POINT DETECTING DEVICE AND CAMERA PROVIDED WITH THE SAME

[75] Inventors: Tokuichi Tsunekawa, Yokohama; Akihiko Nagano, Kawasaki; Kazuki Konishi, Hino, all of Japan

[73] Assignee: Canon Kabushiki Kaisha, Tokyo, Japan

[21] Appl. No.: 348,142

[22] Filed: Nov. 23, 1994

Related U.S. Application Data

[63] Continuation of Ser. No. 101,823, Aug. 4, 1993, abandoned, which is a continuation of Ser. No. 749,518, Aug. 19, 1991, abandoned, which is a continuation of Ser. No. 586,228, Sep. 21, 1990, abandoned.

[30] Foreign Application Priority Data

Sep. 22, 1989 [JP] Japan ............... 1-247336

[51] Int. Cl.$^6$ .............. G03B 7/08; G03B 13/02; G03B 13/36
[52] U.S. Cl. ................ 396/51; 396/121; 396/147; 396/234; 396/287
[58] Field of Search ............ 354/400–409, 354/410, 412, 430, 62, 76, 127.1, 219, 432; 351/209, 210; 396/51, 121, 147, 234, 287

[56] References Cited

U.S. PATENT DOCUMENTS

| | | | |
|---|---|---|---|
| 4,047,187 | 9/1977 | Mashimo et al. | 354/402 X |
| 4,075,640 | 2/1978 | Uedo et al. | 354/432 |
| 4,574,314 | 3/1986 | Weinblatt | 354/400 X |
| 4,836,670 | 6/1989 | Hutchinson | 354/62 |
| 4,943,824 | 7/1990 | Nabeshima et al. | 354/400 |
| 5,170,204 | 12/1992 | Mukai et al. | 354/409 |
| 5,225,862 | 7/1993 | Nagano et al. | 354/62 |
| 5,253,008 | 10/1993 | Konishi et al. | 354/402 |

FOREIGN PATENT DOCUMENTS 63-94232  4/1988  Japan.

*Primary Examiner*—William B. Perkey
*Attorney, Agent, or Firm*—Fitzpatrick, Cella, Harper & Scinto

[57] ABSTRACT

A gazing point detecting device is provided with means for receiving light reflected by an observer's eye and providing an electrical signal, first means for forming gazing axis information regarding the direction of the observer's gazing axis on the basis of the electrical signal, and second means for selecting on the basis of the gazing axis information the direction of the gazing axis which has been pointed to for the longest time of a predetermined unit time or the direction of the gazing axis which is highest in frequency, and forming a signal indicative of the observer's gazing point.

79 Claims, 7 Drawing Sheets

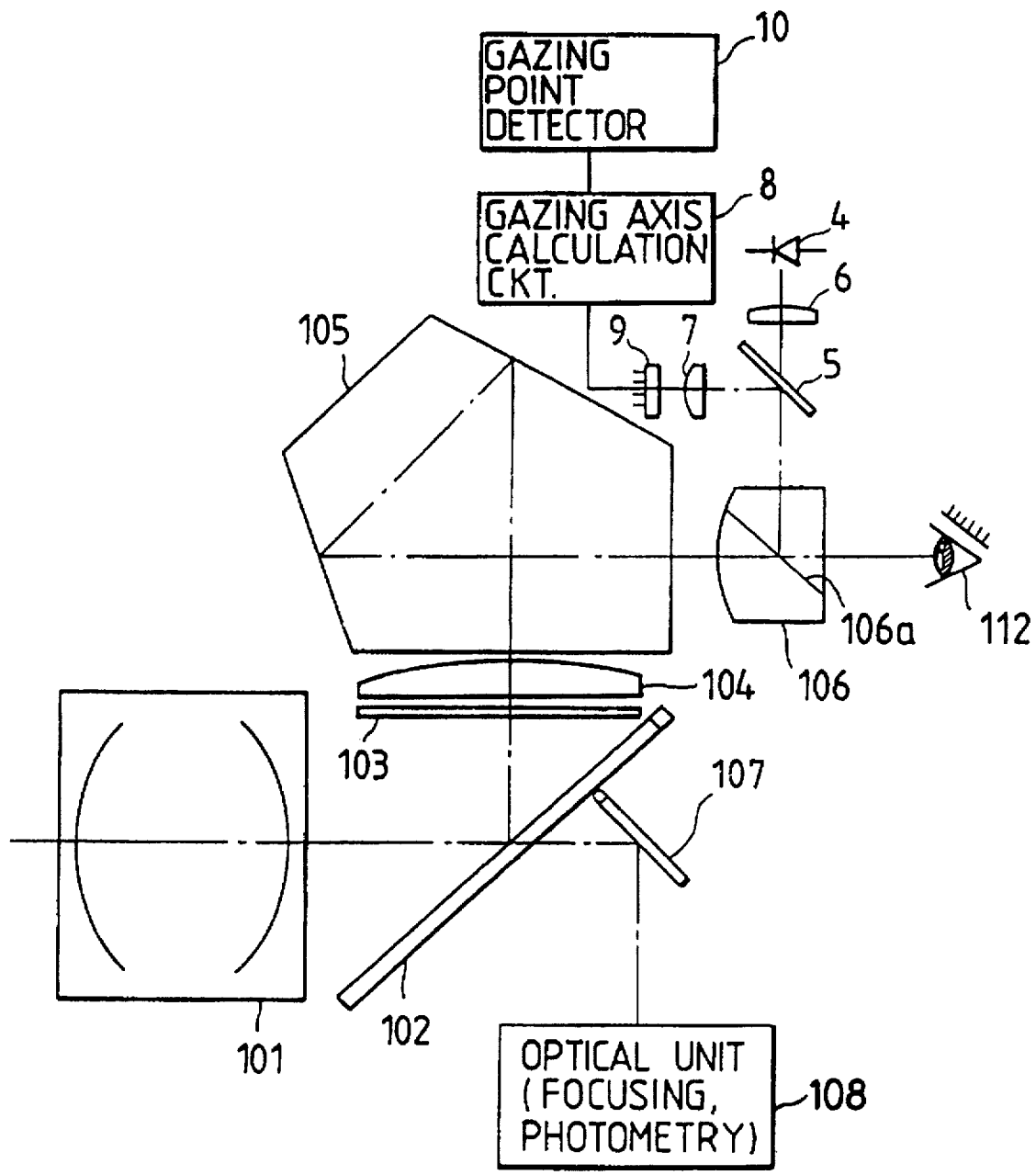

FIG. 3
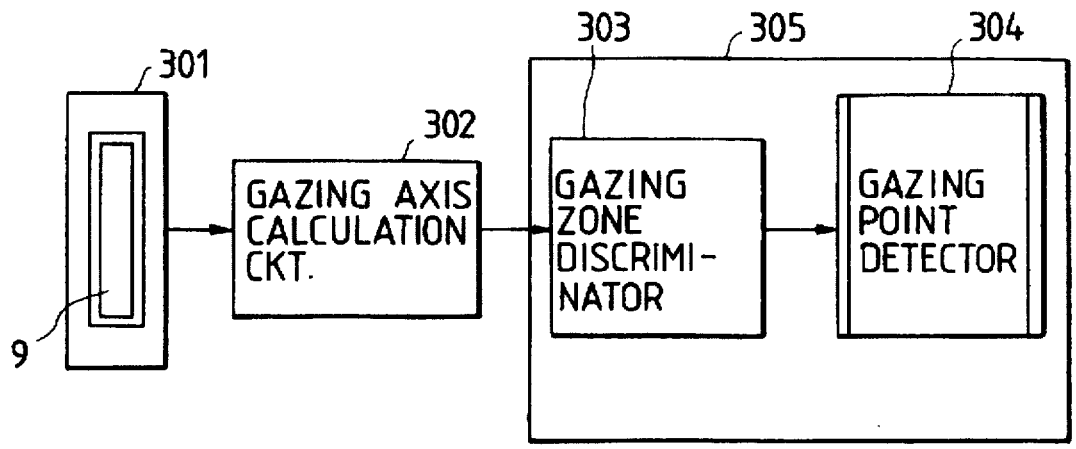
FIG. 4A
| A₁ | A₂ | A₃ |
|----|----|----|
| A₄ | A₅ | A₆ |
| A₇ | A₈ | A₉ |
FIG. 4B
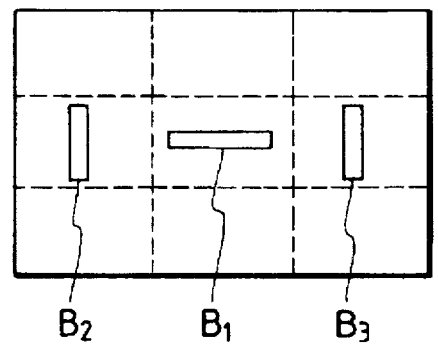

| ZONE | PHOTOMETRY VALUE |
|---|---|
| $A_1$ | $V_1$ |
| $A_2$ | $V_2$ |
| $A_3$ | $V_3$ |
| $A_4$ | $V_4$ |
| $A_5$ | $V_5$ |
| $A_6$ | $V_6$ |
| $A_7$ | $V_7$ |
| $A_8$ | $V_8$ |
| $A_9$ | $V_9$ |

×

| ZONE | WEIGHTING BY FREQUENCY |
|---|---|
| $A_1$ | 1 |
| $A_2$ | 2 |
| $A_3$ | 1 |
| $A_4$ | 2 |
| $A_5$ | 4 |
| $A_6$ | 2 |
| $A_7$ | 1 |
| $A_8$ | 2 |
| $A_9$ | 1 |

GAZING POINT DETECTING DEVICE AND CAMERA PROVIDED WITH THE SAME

This application is a continuation of application Ser. No. 08/101,823, filed Aug. 4, 1993, now abandoned, which is a continuation of application Ser. No. 07/749,518, filed Aug. 19, 1991, now abandoned, which is a continuation of application Ser. No. 07/586,228, filed Sep. 21, 1990, now abandoned.

BACKGROUND OF THE INVENTION

1. Field of the Invention

This invention relates to a gazing point detecting device, and more particularly to a gazing point detecting device in an optical apparatus such as a camera designed to determine the gazing axis (the axis of vision) from a reflected image formed when the eyeball surface of the observer (photographer) is illuminated, and utilize it to detect a point on an observation plane (a focusing plane) on which the object image by a photographing system is formed which is being observed by the observer, i.e., a so-called gazing point.

2. Related Background Art

There have heretofore been proposed various gazing axis detecting devices for detecting what position on the observation plane the observer (examinee) is observing, i.e., detecting the so-called gazing axis.

For example, in Japanese Laid-Open Patent Application No. (61-172552), a parallel light beam from a light source is projected onto the front eye part of an eye to be examined, and the imaged states of the cornea reflected image based on the reflected light from the cornea of the eye to be examined and the central position of the pupil of the eye to be examined are utilized to determine the gazing axis (gazing point).

FIG. 8 of the accompanying drawings is an illustration in which the gazing axis detecting method proposed in the aforementioned publication is modified.

In FIG. 8, the reference numeral 704 designates a light source such as a light emitting diode which emits infrared light, which is not sensed by the observer. The light source 704 is disposed on the focal plane of a light, projection lens 706.

The infrared light emitted from the light source 704 is made into a parallel light beam by the light projection lens 706, is reflected by a half mirror 710 and illuminates the cornea 701 of an eyeball 700. At this time, part of the infrared light reflected by the surface of the cornea 701 is transmitted through the half mirror 710, is condensed by a light receiving lens 707 and is imaged at a position d on an image sensor 709.

Also, the light beams from the end portions a and b of an iris 703 are directed onto the image sensor 709 through the half mirror 710 and the light receiving lens 707, and form the images of the end portions a and b at positions a' and b' thereon. Where the angle of rotation θ of the optic axis y of the eyeball relative to the optic axis x of the light receiving lens 707 is small, when the Z coordinates of the end portions a and b of the iris 703 are Za and Zb, the coordinates Zc of the central position c on the iris 703 are expressed as $$Zc \approx \frac{Za + Zb}{2}.$$

Also, when the Z coordinates of a position d at which the cornea reflected image is generated are Zd and the distance from the center of curvature O of the cornea 701 to the center C of the iris 703 is $\overline{OC}$, the angle of rotation θ of the optic axis y of the eyeball substantially satisfies the following relation:

$$\overline{OC} \cdot \sin\theta \approx Zc - Zd \tag{1}$$

Therefore, by detecting the positions of peculiar points projected onto the image sensor 709 (the images Zd', Za' and Zb' of the position d at which the cornea reflected image is generated and the end portions a and b of the iris on the image sensor 709), the angle of rotation θ of the optic axis y of the eyeball can be determined, whereby the gazing axis of the examinee can be determined. At this time, the formula (1) is rewritten into $$\beta \cdot \overline{OC} \cdot \sin\theta \approx \frac{Za' + Zb'}{2} - Zd', \tag{2}$$

where β is the magnification determined by the distance l between the position d at which the cornea reflected image is generated and the light receiving lens 707 and the distance $l_o$ between the light receiving lens 707 and the image sensor 709, and is usually of a substantially constant value.

By detecting the direction of the gazing axis (the gazing point) of the observer's eye, to be examined in this manner, the position on the focusing plane for what the photographer is observing, for example, in a single-lens reflex camera can be known.

This is effective in that where for example, in an automatic focus detecting device, distance measuring points are provided not only at the center of the picture plane but also at a plurality of locations in the picture plane, when the observer is to select one of those distance measuring points and perform automatic focus detection, the trouble of selecting and inputting one of those distance measuring points is saved and the point that is being observed by the observer is regarded as the distance measuring point and this distance measuring point is automatically selected to thereby effect automatic focus detection.

Also in divisional photometry wherein the photographing range is divided into a plurality of areas and photometry is effected in each of the areas, the information of the afore-described gazing point is used for the weighting of the photometric information of each area, whereby the probability with which exposure matches the range intended by the observer is remarkably improved.

Generally, in the manner in which the human eyeball moves, there are follow-up movements in which the eyeball moves following an object and jump movements when the eyeball sees another object, and also fixation fine movement in which the eyeball constantly moves finely even when it gazes at the same object.

The gazing axis detecting device proposed in the aforementioned Japanese Laid-Open Patent Application No. 61-172552 mentions that the degree of concentration of the gazing axis during a predetermined period is determined and used as a judgment material because generally the eyeball always moves from moment to moment, but this publication is short of giving a specific explanation.

SUMMARY OF THE INVENTION

It is an object of the present invention to provide a gazing point detecting device which, when the observer is observing a predetermined observation range, can effectively extract the information of the direction of the gazing axis (the gazing point) for an object the observer intends, from the information of the direction of the gazing axis of the observer's eyeball which changes from moment to moment.

It is another object of the present invention to provide a gazing point detecting device designed such that the eyeball of the examinee observing a predetermined observation range is illuminated by a light beam from an illuminating means. Image information based on the reflected light from the eyeball is detected by a detecting means. The output signal from the detecting means is utilized to continuously determine the direction of the gazing axis of the eyeball within a predetermined unit of time by a calculation means. The gazing point in the examinee's observation range from the direction of the gazing axis that has been pointed to for the longest time of said predetermined unit time or the direction of the gazing axis that is highest in the frequency of being pointed to is found from the information of the detected direction of the gazing axis.

It is still another object of the present invention to provide a gazing point detecting device designed such that the gazing point in the examinee's observation range from the direction of the gazing axis that has been pointed to for a predetermined time or longer or the direction of the gazing axis that is pointed to a predetermined number of times or more is found from the information of the detected direction of the gazing axis.

In a specific embodiment of the present invention, the direction of the gazing axis is to be detected, for example, when the observation range is divided into a plurality of areas and the extraction of the gazing point is effected on the basis of the time or frequency of the gazing axis points to each area, as previously described.

BRIEF DESCRIPTION OF THE DRAWINGS

FIG. 1A is a schematic view of the essential portions of a first embodiment of the present invention when applied to a single-lens reflex camera.

FIG. 3 is a block diagram of a gazing point detecting electric circuit according to the present invention.

FIGS. 4A and 4B illustrate the observer's observation range according to the present invention.

DESCRIPTION OF THE PREFERRED EMBODIMENTS

Figure 1B:
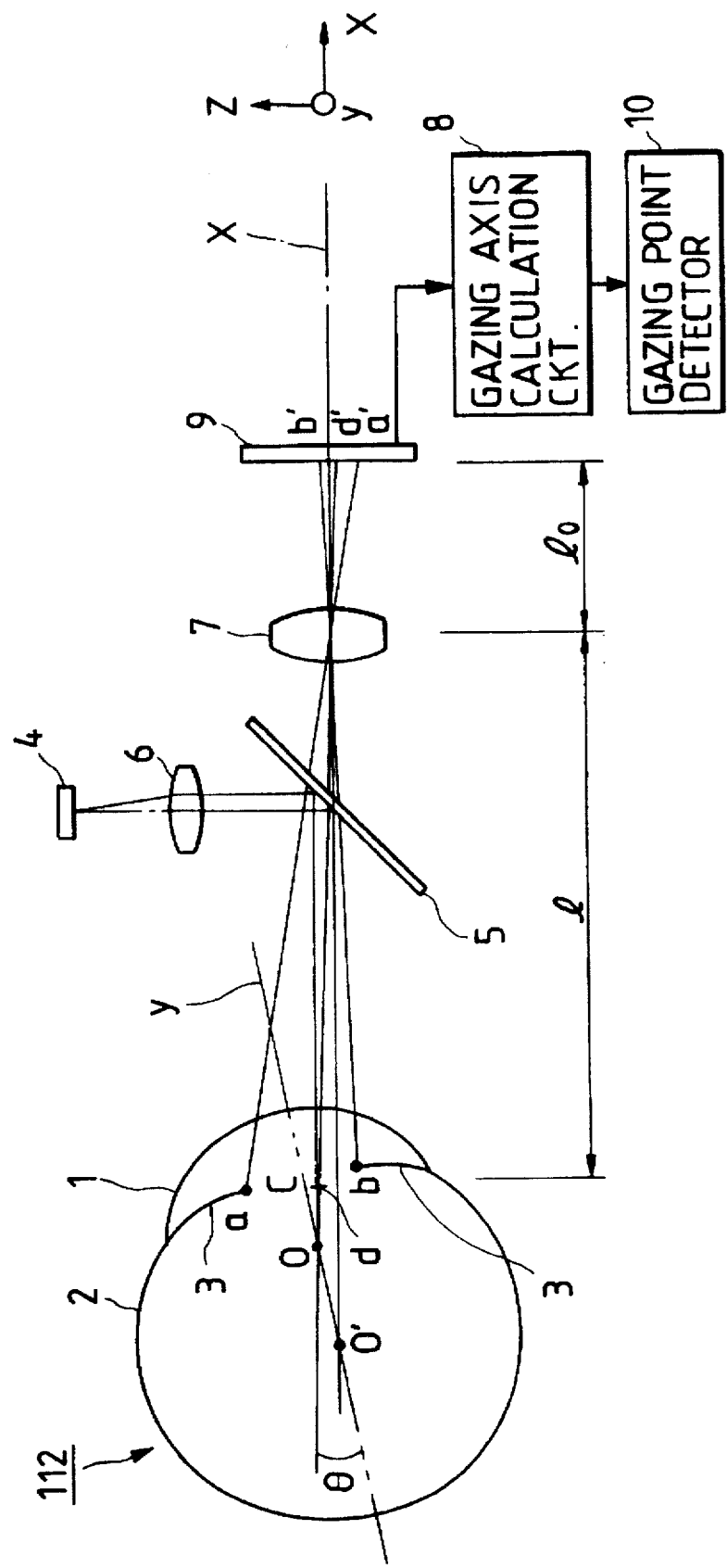
FIG. 1B illustrates the principle of detection of the direction of the gazing axis of an eyeball in the gazing point detecting device of FIG. 1A.

FIG. 1A is a schematic view of the essential portions of a first embodiment of the present invention when applied to a single-lens reflex camera, and FIG. 1B is a view in which the essential portions of the gazing point detecting device of FIG. 1A are extracted and developed and for illustrating a method of detecting the direction of the gazing axis of the observer's eyeball for finding the gazing point.

The outlines of the camera and gazing point detecting device of FIG. 1A will first be described.

The light flux from an object passes through a removably mounted or fixed photo-taking lens 101 and is imaged on a focusing screen 103 via a jump-up mirror 102. The observer observes the object image on the focusing screen as an erect positive image through a pentadach prism 105 by an eyepiece 106 having a dichroic mirror surface 106a. The reference numeral 107 designates a light directing sub-mirror, and the reference numeral 108 denotes a well-known unit for focus detection or photometry or both.

Generally, the observer (examinee) looking into the viewfinder field of the single-lens reflex camera receives and observes the object light (image) transmitted through the photo-taking lens 101 and reflected by the jump-up mirror 102 and formed on the focusing screen, through the pentadach prism 105 and the eyepiece 106. At this time, the observer rotates his eyeball to direct his gazing axis to the object in the viewfinder field that is to be gazed at.

Illuminating means (comprising a light source 4 and a light projection lens 6) is disposed forwardly of the eyepiece 106 and illuminates the observer's eyeball 112 with a substantially parallel light.

Infrared light reflected by the cornea and iris of the eyeball 112 enters the eyepiece 106 and also is reflected by the dichroic mirror portion 106a of the eyepiece 106, and forms the images of the cornea and iris on an image sensor 9 through a half mirror 5 and a light receiving lens 7. The dichroic mirror portion 106a of the eyepiece 106 is formed, for example, by cementing two rectangular prisms each having a dielectric material multilayer film applied thereto, and the dielectric material multi-layer film is set so as to transmit visible light therethrough and reflect infrared light.

From the images of the cornea and iris based on the reflection by the eyeball, which are formed on the image sensor 9, each particular point is detected and as will be described later, the gazing axis is detected by gazing axis calculation means 8, and on the basis of the result thereof, the detection of the gazing point on the focusing screen 103, which is intended by the observer, is effected by gazing point extraction means 10.

The detecting device may be coupled to a viewfinder provided discretely from the photo-taking lens.

Description will now be made of a method of detecting the direction of the gazing axis of the eyeball which is used when the gazing point is to be found in FIG. 1B.

In FIG. 1B, the reference numeral 112 designates the examinee's (observer's) eyeball, the reference numeral 1 denotes the cornea of the examinee's eyeball, the reference numeral 2 designates the sclera of the examinee's eyeball, and the reference numeral 3 denotes the iris of the examinee's eyeball. O' designates the center of rotation of the eyeball 112, O denotes the center of curvature of the cornea 1, a and b designates the end portions of the iris 3, and d denotes a position at which the cornea reflected image based on a light source 4, which will be described later, is generated. The light source 4 is a light emitting diode or the like, which emits infrared light that is not sensed by the examinee. The light source 4 is disposed near the focal plane of a light projection lens 6. The light projection lens 6 makes the light beam from the light source 4 into a parallel light beam, which illuminates the surface of the cornea 1. The light source 4 and the light projection lens 6 together constitute the essential portion of illuminating means.

The reference numeral 7 designates a light receiving lens, which images the cornea reflected image generating position d formed near the cornea 1 and the end portions a and b of the iris on the surface of an image sensor (a photoelectric conversion element) 9. The light receiving lens 7 and the image sensor 9 together constitute the essential portion of the detecting means.

The reference numeral 8 denotes gazing axis calculation means, which calculates and finds the direction of the gazing axis on the basis of the output signal from the image sensor 9. The reference numeral 10 designates gazing point detector means, which extracts by a method which will be described later the gazing point in the direction of the gazing axis intended by the observer, i.e., in the observation field (the area on the surface of the focusing screen 103 of FIG. 1A) on the basis of the information of the direction of the gazing axis output from moment to moment from the gazing axis calculation means 8. It is to be understood that the reference numerals 8 and 10 equivalently indicate respective portions of the treating process by a microcomputer or indicate inherent circuits.

It is possible to control various photographing operations such as evaluation photometry and multipoint distance measurement on the basis of the output signal from the gazing point detector means 10 as the observer desires.

x designates the optic axis of the light projection lens 7, which is coincident with the X-axis in FIG. 1B. y denotes the optic axis of the eyeball, which is inclined by an angle θ with respect to the X-axis.

The optical action of the present embodiment will now be described.

The infrared light emitted from the light source 4 passes through the light projection lens 6, whereafter it becomes substantially parallel light and illuminates the cornea 1 of the eyeball 112. The infrared light passed through the cornea 1 and illuminates the iris 3.

At this time, the cornea reflected image generating position d based on the light beam of the infrared light illuminating the eyeball, which is reflected by the surface of the cornea 1, is imaged at a point d' on the two-dimensional image sensor 9 through the light receiving lens 7.

Also, the infrared light diffused and reflected on the surface of the iris 3 is directed onto the image sensor 9 through the light receiving lens 7 and forms the iris image thereon.

Figure 2:
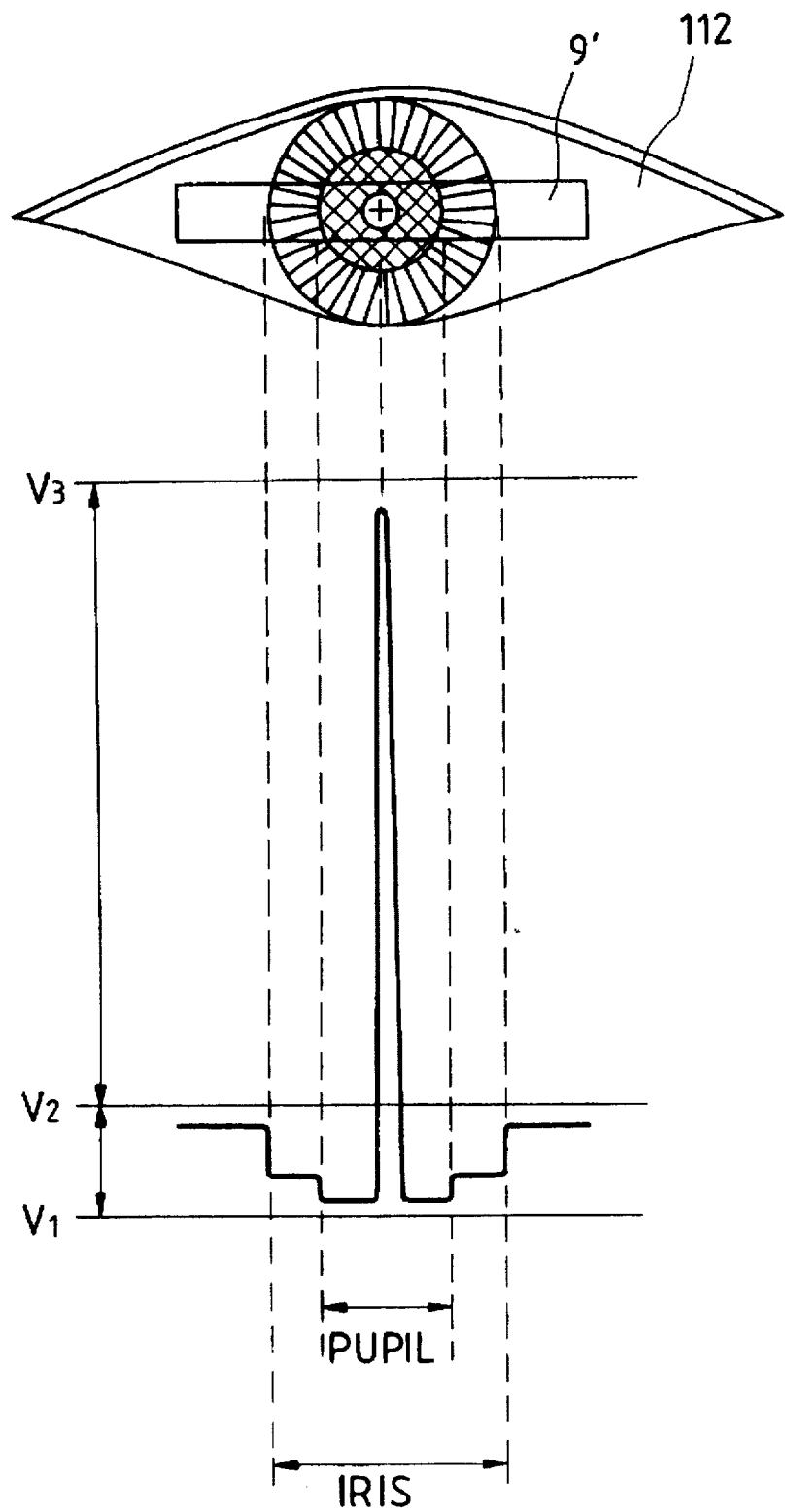
FIG. 2 illustrates a horizontal scanning output signal from an image sensor corresponding to each position of the eyeball in the present invention.

FIG. 2 shows the eye at this time and the horizontal scanning output signal from the image sensor 9, which corresponds to each position on the eyeball when the reflected image from each particular point on the eyeball is formed on the image sensor 9 and the central portion of the eyeball is scanned in the horizontal direction. The reference numeral 9' designates an area in which the image sensor is reversely projected.

The gazing axis calculation means 8 calculates the angle of rotation θ of the eyeball from the position of the cornea reflected image spot and the position of the pupil edge on the basis of the aforementioned formula (2), i.e., in accordance with $$\beta \cdot \underline{OC} \cdot \sin\theta \cong \frac{Za' + Zb'}{2} - Zd'.$$

In the present embodiment, the axis of vision of the eyeball is determined from the then angle of rotation θ, whereby the examinee's gazing axis is detected.

FIG. 3 is a block diagram of the above-described electrical means 8–10 in the gazing point detecting device.

In FIG. 3, the reference numeral 301 designates a device having a photoelectric conversion element (an image sensor), such as a CCD constituting detector means for detecting the reflected image from the eyeball, and a shift register. The reference numeral 302 denotes a gazing axis calculation circuit, and the reference numeral 303 designates a gazing zone discriminator for discriminating which zone on the focusing screen in the observation field the gazing axis faces. The gazing zone discriminator 303 discriminates it from the magnitude of the angle of rotation θ output from the gazing axis calculation circuit 302. The reference numeral 304 denotes a gazing point detector. The gazing zone discriminator 303 and the gazing point detector 304 together constitute a gazing point extraction circuit 305.

FIG. 4 shows the observation range in the present embodiment, for example, the viewfinder screen of the camera. FIG. 4A shows that the view finder screen is divided into nine zones $A_1$–$A_9$ and photometry elements are disposed at positions corresponding thereto to thereby effect divisional photometry. FIG. 4B shows that distance measuring fields are disposed in three zones $B_1$–$B_3$ and distance measuring elements are disposed at positions corresponding thereto to thereby effect multipoint distance measurement.

The output signal from the gazing axis calculation circuit 302 is discriminated, for example, into the zones $A_1$–$A_9$ by the zone discriminator 303 and supplied to the gazing point detector 304. Assuming that for example, as the direction of the gazing axis intended by the observer, the zone $A_5$ is extracted from the gazing point detector 304, then it is possible to effect photometry weighted on the zone $A_5$ and effect distance measurement in the zone $B_1$ to thereby effect photographing under a condition matching the observer's photographing intention.

Figures 5, 6:
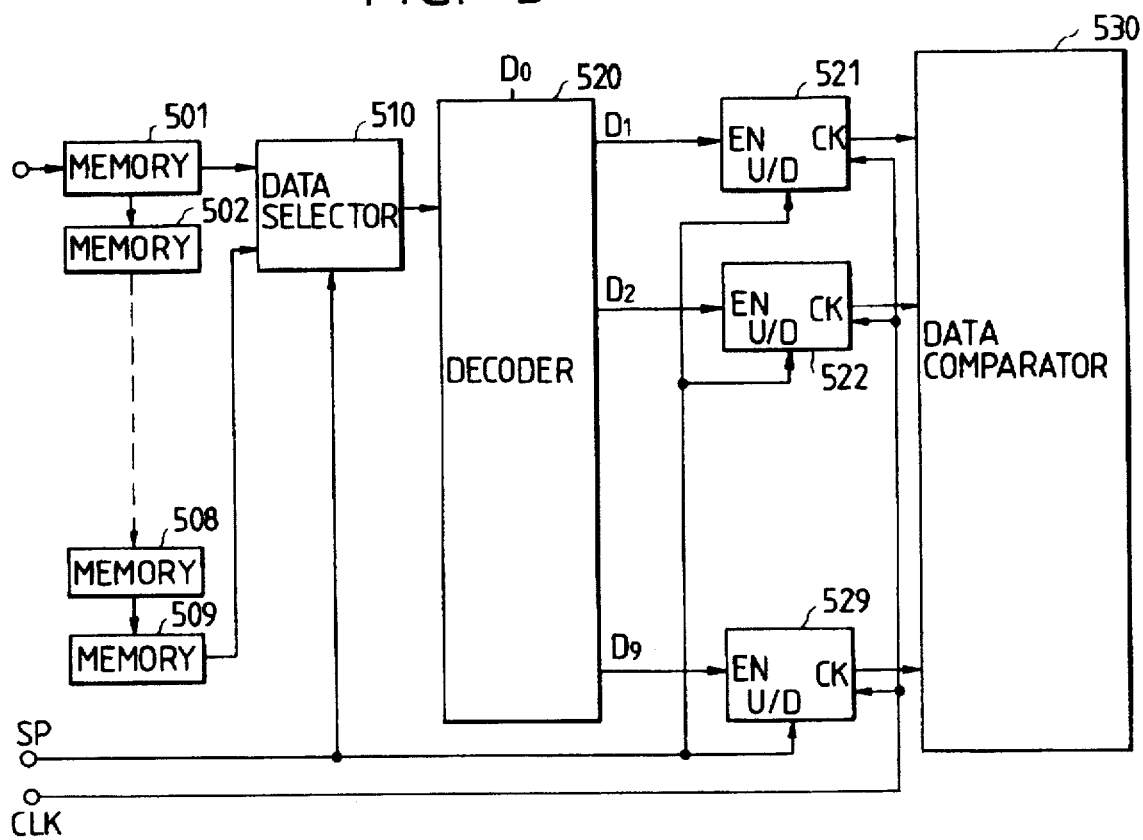
FIG. 5 is a block diagram of a gazing point detecting circuit according to the present invention.
FIG. 6 illustrates weighting photometry.

FIG. 5 is a block diagram of an embodiment of the gazing point extraction circuit 305.

In FIG. 5, the reference numerals 501, 502, ..., 508 and 509 designate serial type transfer memories, which receive as inputs the code information of the zones discriminated by the zone discriminator 303 (FIG. 3) and data-transfer the code information successively to below. The reference numeral 510 denotes a data selector, which changes over the data in the memories 501 and 509 by the pulse from a terminal SP. The reference numeral 520 designates a decoder which decodes the output data of the data selector 510, and the output of one of the terminals $D_0$–$D_9$ is selected. The reference numerals 521–529 denote up-down counters which count, for example, code data corresponding to the zones $A_1$–$A_9$ of FIG. 4, and the propriety of counting is controlled by the signals of the terminals $D_1$–$D_9$, and count up and down is controlled by the terminal SP CLK which designates a count clock input terminal.

The reference numeral 530 designates a data comparing circuit, which compares data stored in the up-down counters 521–529.

The present embodiment detects the number of times, i.e., frequency, at which the observer's gazing axis has pointed to the zone divided into a plurality in the observation range during a predetermined unit time.

In FIG. 5, data older than a predetermined time is discarded and new data is added and renewed, and frequency is always output from the data of the latest predetermined time.

The operation of the present embodiment will hereinafter be described.

When the power source switch of the system is closed, power up clear is applied and the entire circuit is reset to its initial state. At this time, there is no data in the memories 501–509 and thus, all these memories become e.g. 0.

Next, a data renewing pulse is applied to the terminal SP, and while the terminal SP is at a high level, the data in the memory 509 is supplied to the decoder 520 through the data selector 510, and when the input data is 0, the terminal $D_0$ is selected and assumes a high level, and the terminals $D_1$–$D_9$ remain at a low level and the counters 521–529 are all inhibited from counting. That is, the counters do not operate as long as there is no data in the memory 509.

Subsequently, the data in the memories 501–509 are successively shifted to below and the data in the memory 509 is discarded.

Subsequently, the information output through the gazing axis calculation circuit 302 and zone discriminator 303 of FIG. 3 is input to the memory 501. When the terminal SP assumes a low level and the memory 501 is selected by the data selector 510 and the data therein is supplied to the decoder 520, the output terminal corresponding to the data, for example, the terminal $D_2$, assumes a high level and the counter 522 becomes able to count.

At this time, the terminal SP is at a low level and therefore, the counter is in the up count mode, and one renewing clock is applied from a clock terminal CLK and the counter counts up.

Subsequently, a renewing pulse is applied to the terminal SP and the content of the memory 509 is deleted from the counters 521–529. That is, when there is data in the memory 509, as long as the terminal SP is at a high level, the data in the memory 509 is supplied to the decoder 520 through the data selector 510, and when the output terminal corresponding thereto, for example, the terminal $D_2$, is selected and assumes a high level, the counter 522 becomes able to count. At this time, the terminal SP is at a high level and therefore, the counters 521–529 assume the down count mode, and when one renewing clock is applied from the clock terminal CLK, the counter 522 counts down and the data in the memory 509 is deleted.

By such operations being likewise repeated successively, the latest frequency data within a predetermined time is counted by the corresponding counters 521–529. The predetermined time, which is the reference for counting the frequency, can be easily set as required by changing the number of the memories 501–509.

Design is made such that the latest frequency data counted by the counters 521–529 are compared in conformity with use by the data comparing circuit 530 and necessary data are output.

For example, where these data are used for the discrimination of the main object of the automatic focus detecting device of a camera, the zone in which the frequency at which the gazing axis points within the predetermined unit time immediately before the release of the camera is greatest may be discriminated, or the direction of the gazing axis in which a frequency equal to or higher than a predetermined number of times has occurred may be selected, and where these data are used for divisional photometry, if a zone of a predetermined frequency or higher and the frequency are output and a corresponding photometry zone is weighted with the frequency and photometry is effected as shown in FIG. 6, appropriate photographing chiefly in the zone intended by the observer (photographer) will become possible.

Figure 7:
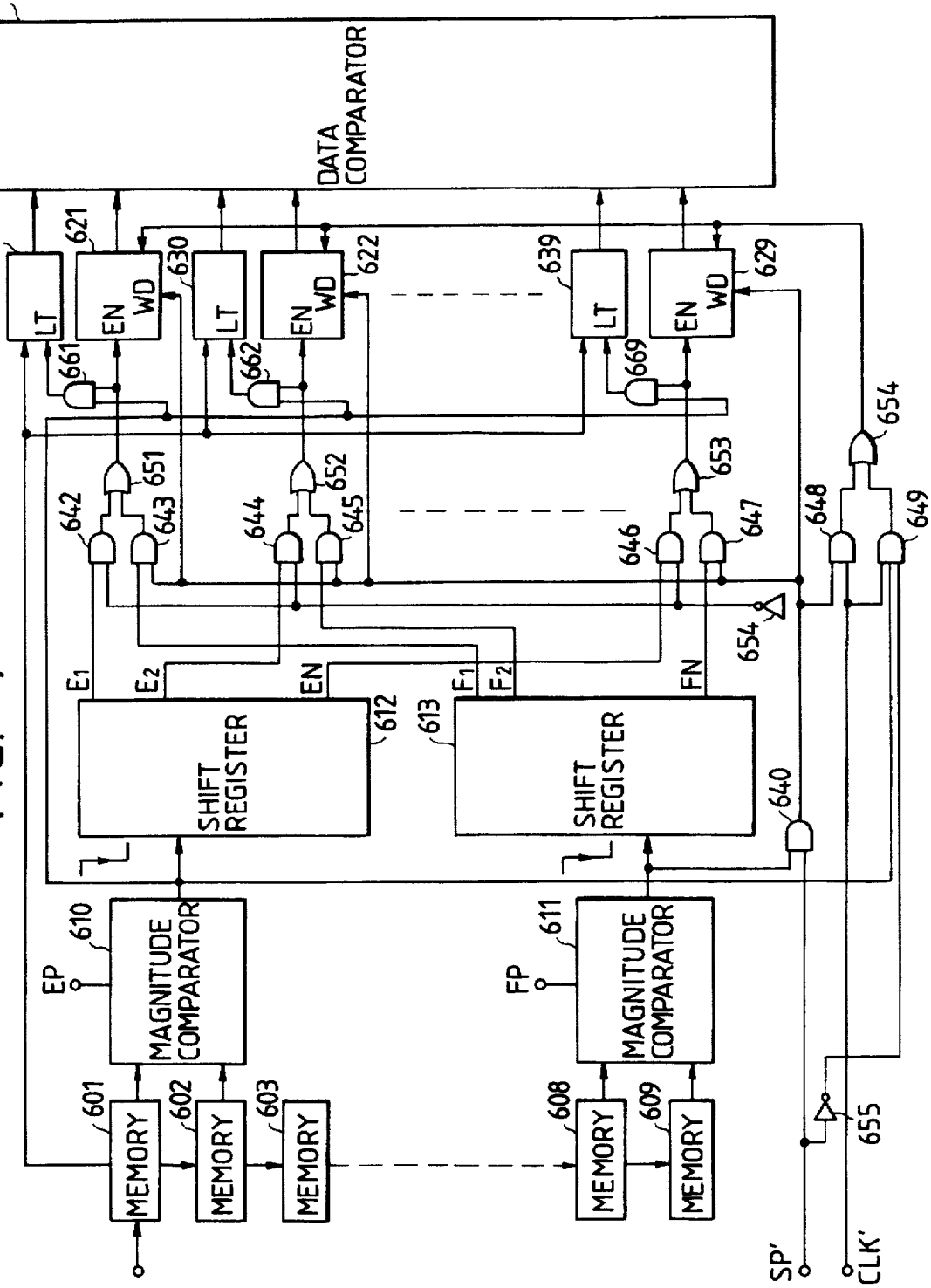
FIG. 7 is a block diagram of a gazing point detecting circuit according to the present invention.
Figure 8:
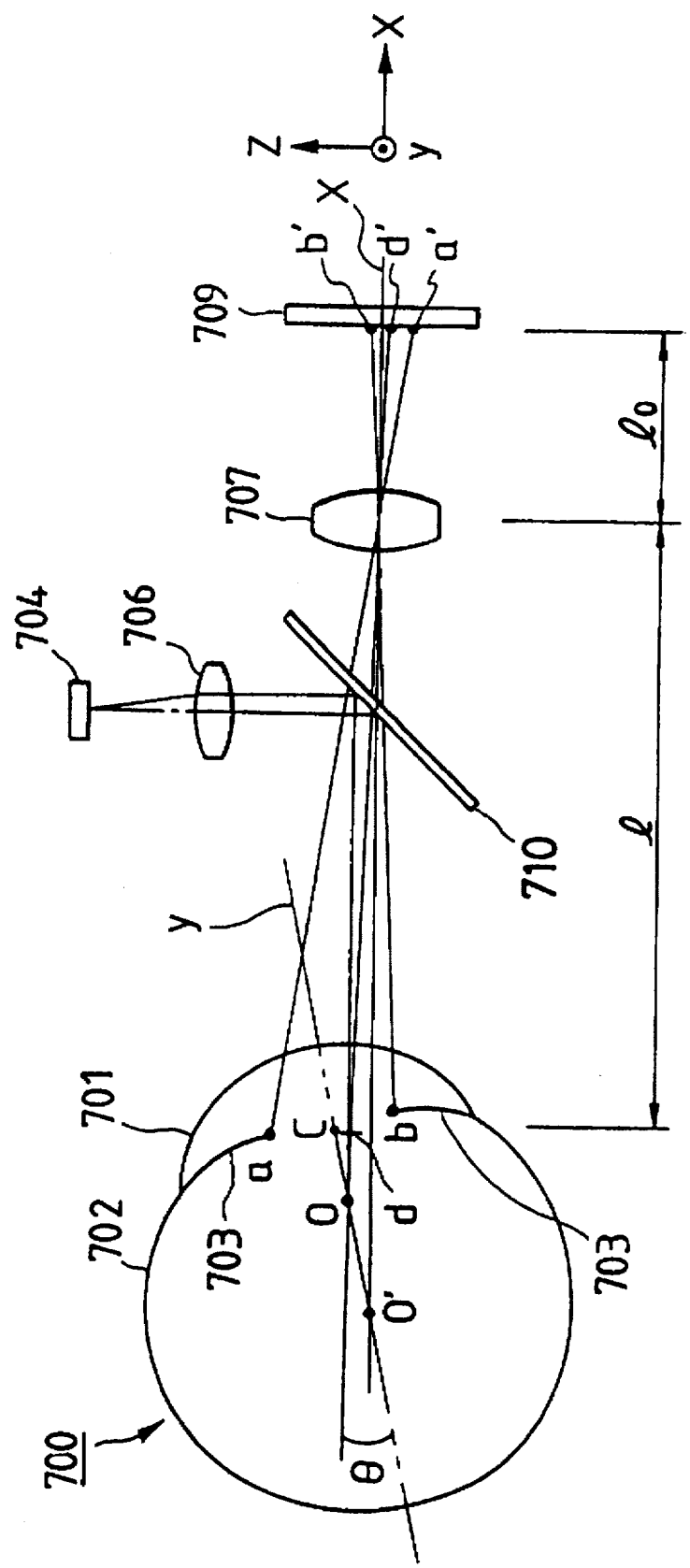
FIG. 8 is a view showing a modification of the gazing axis detecting unit according to the prior art.

FIG. 7 is a block diagram of another embodiment of the gazing point extraction circuit.

In FIG. 7, the reference numerals 601, 602, . . . , 608, 609 designate serial type transfer memories which receives as inputs the code information of the zones discriminated by the zone discriminator 303 and successively transfer the data to below. The reference numerals 610 and 611 denote magnitude comparators which are designed to detect the coincidence between the data in the memories 601 and 602 and the coincidence between the data in the memories 608 and 609, and to assume a high output level as long as the coincidence between the data lasts, and to be reversed to a low level when the data become incoincident. The reference numerals 612 and 613 designate circulation shift registers of which the output terminals $E_1$–$E_N$ and $F_1$–$F_N$ are successively reversed to a high level in synchronism with the falling of the output of the comparator 610. The reference numerals 621–629 denote up-down counters which count, for example, the continuity of code data corresponding to the zones $A_1$–$A_9$ of FIG. 4, and the propriety of their counting is controlled by the signals of the terminals $E_1$–$E_N$ and $F_1$–$F_N$, and the up and down of the count is controlled by the signal from a terminal SP'. CLK' designates a count clock input terminal. The reference numerals 640–649 denote AND gates, the reference numerals 651–653 designate OR gates, and the reference numerals 654 and 655 denote inverters. These constitute the control logic of counter control.

The reference numerals 631–639 designate data latches which record and hold therein the code data of the discriminated zones corresponding to consecutive count numbers stored in the corresponding counters 621–629, and latch the data entered into the memory 601 in synchronism with the reversal of the outputs of AND gates 661–669 to the high level side. The reference numeral 670 denotes a data comparator which compares the data stored in these counters 621–629.

The present embodiment detects the degree to which the gazing axis continuously points to a particular discriminated zone during a predetermined unit time, i.e., the degree of stoppage of the gazing axis.

In FIG. 7, after the lapse of a predetermined time, old data is discarded and new data is added and renewed, and the degree of stoppage of the gazing axis is always output from the data within the latest predetermined time.

The operation of the present embodiment will hereinafter be described.

When the power source switch of the system is closed, power up clear is first applied and the whole circuit is reset to its initial state. At this time, there are no data in the memories 601–609 and therefore, all of these memories become e.g. 0.

It will be inconvenient if a coincidence signal is output from the magnitude comparators 610 and 611 in their initial state and therefore, as regards the magnitude comparator 610, the output thereof is forcibly maintained at a low level until true data enters the memories 601 and 602 through the terminal EP, and as regards the magnitude comparator 611, the output thereof is forcibly maintained at a low level until true data enters the memories 608 and 609 through the terminal FP.

Subsequently, the information output through the gazing axis calculation circuit 302 and zone discriminator 303 of FIG. 3 is input to the memories 601 and 602, and assuming that this data is, for example, the code data of the zone $A_5$ of FIG. 3, the output of the magnitude comparator 610 is reversed to the high level side and detects the coincidence between the data. Also, the output of the circulation shift register 612 is at a high level with the terminal $E_1$ being selected at first and therefore, the counter 621 is ready to count through the AND gate 642 and the OR gate 651. When the coincidence between the memories 601 and 602 is detected, the data renewing pulse input terminal SP' is at a low level and therefore, the U/D terminals of the counters 621–629 assume a low level and thus, the up count mode is provided.

When the coincidence between the data of the memories 601 and 602 is detected by the magnitude comparator 610, the output of the magnitude comparator 610 assumes a high level, and when a data renewing clock is input to the clock input terminal CLK', a count clock is input to the counter 621–629 through the AND gate 649 and the OR gate 654. At this time, only the counter 621 is ready to count and therefore, up-counts by one.

Also, when the coincidence is detected and the output of the magnitude comparator 610 is reversed to a high level, the data latch 631 disposed correspondingly to the counter 621, which is then ready to count, is driven through the AND gate 661 and the code data of the memory 601 is latched and recorded.

When the code data of another zone is then input, the magnitude comparator 610 outputs incoincidence and therefore, its output is reversed to a low level, and in synchronism therewith, the circulation shift register 612 assumes a high level with the terminal $E_2$ being selected and the counter 622 becomes ready to count, but as long as the output of the magnitude comparator 610 is at a low level, the AND gate 649 cannot take AND and therefore, up count is not effected.

In this manner, the number for which the coincidence between code data has been continuously taken and the code data thereof are successively recorded in the counters 621–629.

Next, when data renewal in which old data is discarded is to be effected, when the code data of the same discriminated zone enters the memories 608 and 609, the coincidence therebetween is detected by the magnitude comparator 611, and the output of the magnitude comparator 611 is reversed to the high level side, and as long as the data renewing pulse applied to the terminal SP' is at a high level, the AND gates 642, 644 and 646 are cut through the AND gate 640 and the inverter 654, and the AND gates 643, 645 and 647 are opened and thus, the counter corresponding to the output of the circulation shift register 613 becomes ready to count. Since the circulation shift register 613 has its terminal $F_1$ initially set to a high level at first, the counter 621 becomes ready to count. The up-down control terminal of this counter assumes a high level and therefore, the counter assumes the down count mode, and when a renewing clock is input through the clock terminal CLK', the counter 621 count down by one through the AND gate 648 and the OR gate 654, and the coincidence information detected at first is deleted.

The count-up of the continuous information by the coincidence information detected by the magnitude comparator 610 and the count-down for the data renewal by the coincidence information detected by the magnitude comparator 611 are designed relative to each other, and the renewal of the data is effected sequentially.

Design is made such that the latest stoppage data of the gazing axis counted by the counters 621–629 are compared with one another in conformity with use by the data comparing circuit 670 and the necessary data is output.

When, for example, these data are used for the discrimination between the main objects of the automatic focus detecting device of a camera, the zone in which the number of times of continuous stoppage (the stoppage time) for the same area within a predetermined unit time immediately before the release of the camera is greatest may be discriminated or the direction of the gazing axis in which a frequency over a predetermined stoppage time has occurred may be chosen, and when these data are used for divisional photometry, if the zone which stops over a predetermined number of times (a predetermined time) and the number of times of the stoppage are output and the corresponding photometry zone is weighted on the basis of the number of times of the stoppage and then photometry is effected, appropriate photographing will become possible chiefly in the zone intended by the observer (photographer).

A setting dial or switch may be provided so that the frequency which provides the reference of discrimination used in FIGS. 5 and 7 and the number of times of the stoppage (the stoppage time) can be freely set by the photographer in conformity with his photographing skill.

Also, the reference of discrimination between data may be changed so that weight may be great in the central portion of the photographing range (observation range) and light in the marginal portion.

In the embodiments described above, in order to shorten the calculation processing time, the circuit system is constructed of hardware, but the calculation system may be constructed of software.

According to the present invention, as described above, there can be achieved a gazing point detecting device in which the examinee's eyeball is illuminated by illuminating means. The imaging points, on a predetermined surface, of the cornea reflected image generated and formed by the cornea and the iris image based on the scattering of the iris are detected through gazing axis detecting means having the aforedescribed construction. The information in the direction of the gazing axis of the eyeball is obtained therefrom and the gazing point intended by the observer (photographer) can be effectively extracted on the basis of said information in the direction of the gazing axis.

We claim:

1. A camera having a finder, said camera comprising:
a distance measuring apparatus including a gazing point detecting device, wherein the distance measuring apparatus comprises:
  means for defining a plurality of distance measuring areas simultaneously displayed in a view field in the finder;
  a plurality of distance measuring means arranged to correspond respectively to each of the plurality of distance measuring areas;
  means for defining a plurality of discriminating zones in the view field in the finder, the plurality of discriminating zones being formed by dividing the view field by a plurality of mutually intersecting lines, each of the plurality of discriminating zones including one of the plurality of distance measuring areas, a dimension of each of said plurality of distance measuring areas being smaller than a dimension of each of said plurality of discriminating zones; and
  means for discriminating in which zone of the plurality of discriminating zones a gazing point exists and for performing a distance measurement using the distance measuring means corresponding to the distance measuring area in the zone discriminated by said discriminating means.

2. A camera according to claim 1 wherein said gazing point detecting device of said distance measuring apparatus comprises:
  means for receiving light reflected by an observer's eye and providing an electrical signal in response to the light received;
  division means for electronically dividing an observation view field into a plurality of areas through which the observer can view an image;

first means for receiving the electrical signal and for forming gazing axis information regarding a direction of an observer's gazing axis, said first means defining each of the plurality of areas as a unit on which an observer's gazing point is detectable; and second means for independently processing the gazing axis information formed by said first means for each of the plurality of areas during a predetermined time period, and for detecting the observer's gazing point based on the information processed for each of the plurality of areas.

3. A gazing point detecting device according to claim 2, further provided with an eyepiece for determining the observer's observation field.

4. A gazing point detecting device according to claim 2, wherein dimensions and positions of said areas are determined correspondingly to a predetermined function of an optical apparatus to which said device is coupled.

5. A gazing point detecting device according to claim 4, wherein said optical apparatus is a camera, and said predetermined function is photometry.

6. A gazing point detecting device according to claim 4, wherein said optical apparatus is a camera, and said predetermined function is focus detection.

7. A camera according to claim 1, wherein said gazing point detecting device of said distance measuring apparatus comprises:

means for receiving light reflected by an observer's eye and providing an electrical signal in response to the light received;

first means for forming gazing axis information regarding a direction of an observer's gazing axis, on the basis of the electrical signal, corresponding to each of a plurality of areas of the observer's view field, the plurality of areas being defined by a plurality of intersecting lines that divide the observer's view field; and second means for detecting, on the basis of the gazing axis obtained in a predetermined time period, one of a gazing axis to which the observer's gazing axis corresponds for a greatest amount of time during the predetermined time period and a gazing axis to which the observer's gazing axis corresponds more than a predetermined number of times and for producing information representing the observer's gazing point based on the direction of the gazing axis thus detected.

8. A gazing point detecting device according to claim 7, wherein said first means forms the gazing axis information using each of the plurality of areas as a unit on which an observer's gazing point is detectable.

9. A gazing point detecting device according to claim 8, further provided with an eyepiece for determining the observer's observation field.

10. A gazing point detecting device according to claim 8, wherein dimensions and positions of said areas are determined correspondingly to a predetermined function of an optical apparatus to which said device is coupled.

11. A gazing point detecting device according to claim 10, wherein said optical apparatus is a camera, and said predetermined function is photometry.

12. A gazing point detecting device according to claim 10, wherein said optical apparatus is a camera and said predetermined function is focus detection.

13. A gazing point detecting device according to claim 2, wherein said predetermined condition is when a direction to which the gazing axis is maintained for a greatest amount of time during the predetermined time period or a direction to which the gazing axis is directed in a greatest number of times is determined as the gazing axis direction.

14. A gazing point detecting device according to claim 2, wherein the starting point of said predetermined time period is renewed.

15. A distance measuring apparatus provided with a gazing point detecting device, said distance measuring apparatus comprising:

means for defining a plurality of distance measuring areas simultaneously displayed in a view field in a finder;

a plurality of distance measuring means arranged to correspond respectively to each of the plurality of distance measuring areas;

means for defining a plurality of discriminating zones in the view field in the finder, the plurality of discriminating zones being formed by dividing the view field by a plurality of mutually intersecting lines, each of the plurality of discriminating zones including one of the plurality of distance measuring areas, a dimension of each of said plurality of distance measuring areas being smaller than a dimension of each of said plurality of discriminating zones; and means for discriminating in which zone of the plurality of discriminating zones a gazing point exists and for performing a distance measurement using the distance measuring means corresponding to the distance measuring area in the discriminated zone.

16. A distance measuring apparatus comprising:

observing means having a view field;

a plurality of distance measuring areas simultaneously displayed in the view field;

means for defining a plurality of discriminating zones in said view field, the plurality of discriminating zones being defined by dividing the view field with a line crossing from one edge of the view field to the opposite edge thereof, each of the plurality of distance measuring areas being formed in mutually different ones of the plurality of discriminating zones, a dimension of each of said plurality of distance measuring areas being smaller than a dimension of each of said plurality of discriminating zones; and means for detecting which zone of said plurality of discriminating zones is being gazed at by an observer, wherein distance measuring is performed with respect to a distance measuring area formed in the detected discriminating zone.

17. A distance measuring apparatus according to claim 16, wherein the plurality of discriminating zones are defined by dividing the view field with a line crossing from an upper edge of the view field to a lower edge thereof.

18. A distance measuring apparatus according to claim 16, wherein the plurality of discriminating zones are defined by dividing the view field with a line crossing from an upper edge of the view field to a lower edge thereof and at least one line crossing from a right edge of the view field to a left edge thereof.

19. A distance measuring apparatus according to claim 18, wherein the plurality of discriminating zones are defined by dividing the view field with a plurality of lines crossing from the upper edge of the view field to the lower edge thereof and a plurality of lines crossing from the right edge of the view field to the left edge thereof.

20. A distance measuring apparatus according to claim 16, wherein the plurality of discriminating zones are defined by dividing the view field with a line crossing from a right edge of the view field to a left edge thereof.

21. A distance measuring apparatus according to claim 20, wherein the plurality of discriminating zones are defined by dividing the view field with a plurality of lines crossing from the right edge of the view field to the left edge thereof.

22. A distance measuring apparatus according to claim 16, further comprising a plurality of distance measuring means for measuring distance, said plurality of distance measuring means respectively corresponding to the plurality of distance measuring areas.

23. A camera comprising:

a finder having a view field;

a plurality of distance measuring areas simultaneously displayed in the view field of said finder;

means for defining a plurality of discriminating zones in the view field, said plurality of discriminating zones being defined by dividing the view field with a line crossing from one edge of the view field to the opposite edge thereof, each of the plurality of distance measuring areas being formed in mutually different ones of the plurality of discriminating zones, a dimension of each of said plurality of distance measuring areas being smaller than a dimension of each of said plurality discriminating zones;

means for detecting which zone of the plurality of discriminating zones is being gazed at by an observer; and means for performing distance measuring with respect to the distance measuring area formed in the detected discriminating zone.

24. A camera according to claim 23, wherein the plurality of discriminating zones are defined by dividing the view field with a line crossing from an upper edge of the view field to a lower edge thereof.

25. A camera according to claim 24, wherein the plurality of discriminating zones are defined by dividing the view field with a plurality of lines crossing from the upper edge of the view field to the lower edge thereof.

26. A camera according to claims 23, wherein the plurality of discriminating zones are defined by dividing the view field with a line crossing from an upper edge of the view field to a lower edge thereof and at least one line crossing from a right edge of the view field to a left edge thereof.

27. A camera according to claim 26, wherein the plurality of discriminating zones are defined by dividing the view field with a plurality of lines crossing from the upper edge of the view field to the lower edge thereof and a plurality of lines crossing from the right edge of the view field to the left edge thereof.

28. A distance measuring apparatus according to claim 23, wherein the plurality of discriminating zones are defined by dividing the view field with a line crossing from a right edge of the view field to a left edge thereof.

29. A distance measuring apparatus according to claim 28, wherein the plurality of discriminating zones are defined by dividing the view field with a plurality of lines crossing from the right edge of the view field to the left edge thereof.

30. A distance measuring apparatus according to claim 23, further comprising a plurality of distance measuring devices respectively corresponding to each of the plurality of distance measuring areas.

31. An optical apparatus comprising:

observing means having a view field;

a plurality of measuring areas simultaneously displayed in said view field;

means for defining a plurality of detecting areas in the view field, said defining means defining the plurality of detecting areas by dividing the view field with lines extending from one side of the view field to an opposite side of the view field, wherein each of said plurality of measuring areas is disposed in mutually different areas of said plurality of detecting areas, a dimension of each of said plurality of measuring areas being smaller than a dimension of each of said plurality of detecting areas;

visual axis detecting means for detecting a direction of a visual axis of an observer to form visual axis information; and processing and selecting means for processing visual axis information related to each of the plurality of detecting areas and for selecting a detecting area from among the plurality of detecting areas based on a result of the processing.

32. An optical apparatus according to claim 31, further comprising:

means for receiving light reflected by an observer's eye looking at a view field of said observation means and for producing an electrical signal in response to the light received;

memory means for memorizing detection data concerning an observer's gazing axis direction, based on the electrical signal, corresponding to each area of the plurality of areas of the view field of said observation means; and signal producing means for detecting, based on the detection data, one of a time period within which the direction of the observer's gazing axis is maintained toward respective areas of the plurality of areas and a number of times that the observer's gazing axis is directed to respective areas of the plurality of areas, for comparing the thus detected result with a predetermined condition, and for producing a signal representing an area at which the observer is gazing among the plurality of areas.

33. A camera according to claim 32, wherein said signal producing means selects a direction of a gazing axis that has been pointed to for the longest time of a predetermined unit time or an area which is highest in frequency.

34. A camera according to claim 32, wherein said signal producing means selects a direction of a gazing axis in which a gazing axis has stopped for a time longer than a predetermined time or the area which has been pointed to over a predetermined number of times per unit time.

35. A camera according to claim 32, wherein said areas are determined correspondingly to photometry areas of a photometric element.

36. A camera according to claim 33, wherein said areas are determined correspondingly to detection areas of a focus detecting element.

37. An optical apparatus according to claim 32, wherein said detecting data is obtained within a predetermined time period and a starting point of the predetermined time period can be renewed.

38. An optical apparatus according to claim 37, wherein said optical apparatus is a camera and said signal producing means selects said area to which gazing axis has continuously been maintained for a greatest time period within the predetermined time period immediately before a releasing of a shutter of the camera.

39. An optical apparatus according to claim 32, wherein said optical apparatus is a camera, said signal producing means selects said area to which the gazing axis is directed longer than a predetermined time period or directed more than a predetermined number of times, and produces the signal which is weighed based on the time period or the number of times said area is selected.

40. An optical apparatus according to claim 31, further comprising:

reception means for receiving light reflected by an observer's eye and for providing an electrical signal in response to the light received;

momentary gazing area detection means for receiving the electrical signal and for forming momentary signals at predetermined time intervals based on the electrical signal, the momentary signals indicating which one of the plurality of viewing areas the observer's eye is aimed toward at the time the respective signal is formed; and intended gazing area determining means for receiving the momentary signals formed during a predetermined time period and for determining an intended gazing area, when the momentary signals formed during the predetermined time period indicate more than one viewing area, by detecting which of the viewing areas is indicated for a greatest amount of time during the predetermined time period.

41. An optical apparatus according to claim 31, further comprising:

reception means for receiving light reflected by an observer's eye and for providing an electrical signal in response to the light received;

momentary gazing area detection means for receiving the electrical signal and for forming momentary signals at predetermined time intervals based on the electrical signal, the momentary signals indicating which one of the plurality of viewing areas the observer's eye is aimed toward at the time the respective signal is formed; and intended gazing area determining means for receiving the momentary signals formed during a predetermined time period and for determining an intended gazing area, when the momentary signals formed during the predetermined time period indicate more than one viewing area, by detecting which of the viewing areas is indicated more than a predetermined number of times during the predetermined time period.

42. An apparatus according to claim 31, wherein said processing and selecting means comprises:

counting and selecting means for counting a number of times that the visual axis is directed to each of the plurality of detecting areas and for selecting a detecting area from among the plurality of detecting areas based on the result of the counting.

43. An optical apparatus according to claim 42, wherein said counting and selecting means selects a detecting area to which the visual axis is directed a predetermined number of times or more.

44. An optical apparatus according to claim 42, wherein said counting and selecting means selects the detecting area to which the visual axis is directed the greatest number of times.

45. An optical apparatus according to claim 42, wherein the plurality of detecting areas are defined by dividing the view field with at least one line crossing from an upper edge of the view field to a lower edge thereof.

46. An optical apparatus according to claim 45, wherein the plurality of detecting areas are defined by dividing the view field with a plurality of lines crossing from the upper edge of the view field to the lower edge thereof.

47. An optical apparatus according to claim 42, wherein the plurality of detecting areas are defined by dividing the view field with a line crossing from an upper edge of the view field to a lower edge thereof and at least one line crossing from a right edge of the view field to a left edge thereof.

48. An optical apparatus according to claim 47, wherein the plurality of detecting areas are defined by dividing the view field with a plurality of lines crossing from the upper edge of the view field to the lower edge thereof and a plurality of lines crossing from the right edge of the view field to the left edge thereof.

49. An optical apparatus according to claim 42, wherein the plurality of detecting areas are defined by dividing the view field with a line crossing from a right edge of the view field to a left edge thereof.

50. An optical apparatus according to claim 49, wherein the plurality of detecting areas are defined by dividing the view field with a plurality of lines crossing from the right edge of the view field to the left edge thereof.

51. An apparatus according to claim 31, wherein said processing and selecting means comprises:

measuring and selecting means for measuring an amount of time that the visual axis is directed to each of the plurality of detecting areas and for selecting a detecting area from among the plurality of detecting areas based on the result of the measuring.

52. An optical apparatus according to claim 51, wherein said measuring and selecting means selects a detecting area to which the visual axis is directed for a predetermined period of time or longer.

53. An optical apparatus according to claim 51, wherein said measuring and selecting means selects a detecting area to which the visual axis is directed the most time.

54. An optical apparatus according to claim 51, wherein the plurality of detecting areas are defined by dividing the view field with a line crossing from an upper edge of the view field to a lower edge thereof.

55. An optical apparatus according to claim 54, wherein the plurality of detecting areas are defined by dividing the view field with a plurality of lines crossing from the upper edge of the view field to the lower edge thereof.

56. An optical apparatus according to claim 51, wherein the plurality of detecting areas are defined by dividing the view field with a line crossing from an upper edge of the view field to a lower edge thereof and at least one line crossing from a right edge of the view field to a left edge thereof.

57. An optical apparatus according to claim 56, wherein the plurality of detecting areas are defined by dividing the view field with a plurality of lines crossing from the upper edge of the view field to the lower edge thereof and a plurality of lines crossing from the right edge of the view field to the left edge thereof.

58. An optical apparatus according to claim 51, wherein the plurality of detecting areas are defined by dividing the view field with a line crossing from a right edge of the view field to a left edge thereof.

59. An optical apparatus according to claim 58, wherein the plurality of detecting areas are defined by dividing the view field with a plurality of lines crossing from the right edge of the view field to the left edge thereof.

60. An optical apparatus according to claim 31, wherein the plurality of detecting areas are defined by dividing the view field with at least one line crossing from an upper edge of the view field to a lower edge thereof.

61. An optical apparatus according to claim 60, wherein the plurality of detecting areas are defined by dividing the view field with a plurality of lines crossing from the upper edge of the view field to the lower edge thereof.

62. An optical apparatus according to claim 31, wherein the plurality of detecting areas are defined by dividing the view field with a line crossing from an upper edge of the view field to a lower edge thereof and at least one line crossing from a right edge of the view field to a left edge thereof.

63. An optical apparatus according to claim 62, wherein the plurality of detecting areas are defined by dividing the view field with a plurality of lines crossing from the upper edge of the view field to the lower edge thereof and a plurality of lines crossing from the right edge of the view field to the left edge thereof.

64. An optical apparatus according to claim 31, wherein the plurality of detecting areas are defined by dividing the view field with a line crossing from a right edge of the view field to a left edge thereof.

65. An optical apparatus according to claim 64, wherein the plurality of detecting areas are defined by dividing the view field with a plurality of lines crossing from the right edge of the view field to the left edge thereof.

66. A measuring apparatus comprising:
a plurality of measuring areas simultaneously displayed in a view field;
means for defining a plurality of discriminating zones in the view field, the plurality of discriminating zones being defined by dividing the view field with a line crossing from one edge of the view field to the opposite edge thereof, and each of the plurality of measuring areas being formed in mutually different ones of the plurality of discriminating zones, a dimension of each of said plurality of measuring areas being smaller than a dimension of each of said plurality of discriminating zones; and
means for detecting which zone of the plurality of discriminating zones is being gazed at by an observer, wherein measuring data are provided with respect to the measuring area formed in the detected discriminating zone.

67. A measuring apparatus according to claim 66, wherein the plurality of discriminating zones are defined by dividing the view field with a line crossing from an upper edge of the view field to a lower edge thereof.

68. A measuring apparatus according to claim 67, wherein the plurality of discriminating zones are defined by dividing the view field with a plurality of lines crossing from the upper edge of the view field to the lower edge thereof.

69. A measuring apparatus according to claim 66, wherein the plurality of discriminating zones are defined by dividing the view field with a line crossing from an upper edge of the view field to a lower edge thereof and at least one line crossing from a right edge of the view field to a left edge thereof.

70. A measuring apparatus according to claim 69, wherein the plurality of discriminating zones are defined by dividing the view field with a plurality of lines crossing from the upper edge of the view field to the lower edge thereof and a plurality of lines crossing from the right edge of the view field to the left edge thereof.

71. A measuring apparatus according to claim 66, wherein the plurality of discriminating zones are defined by dividing the view field with a line crossing from a right edge of the view field to a left edge thereof.

72. A measuring apparatus according to claim 71, wherein the plurality of discriminating zones are defined by dividing the view field with a plurality of lines crossing from the right edge of the view field of the left edge therof.

73. An apparatus comprising:
a plurality of measuring areas simultaneously displayed in a view field;
means for defining a plurality of discriminating zones in the view field, the plurality of discriminating zones being defined by dividing the view field with a line crossing from one edge of the view field to the opposite edge thereof, each of the plurality of measuring areas being formed in mutually different ones of the plurality of discriminating zones, a dimension of each of said plurality of measuring areas being smaller than a dimension of each of said plurality of discriminating zones;
means for detecting which zone of the plurality of discriminating zones is being gazed at by an observer; and
means for providing measuring data with respect to the measuring area formed in the detected discriminating zone.

74. A measuring apparatus according to claim 73, wherein the plurality of discriminating zones are defined by dividing the view field with a line crossing from an upper edge of the view field to a lower edge thereof.

75. A measuring apparatus according to claim 74, wherein the plurality of discriminating zones are defined by dividing the view field with a plurality of lines crossing from the upper edge of the view field to the lower edge thereof.

76. A measuring apparatus according to claim 73, wherein the plurality of discriminating zones are defined by dividing the view field with a line crossing from an upper edge of the view field to a lower edge thereof and at least one line crossing from a right edge of the view field to a left edge thereof.

77. A measuring apparatus according to claim 76, wherein the plurality of discriminating zones are defined by dividing the view field with a plurality of lines crossing from the upper edge of the view field to the lower edge thereof and a plurality of lines crossing from the right edge of the view field to the left edge thereof.

78. A measuring apparatus according to claim 73, wherein the plurality of discriminating zones are defined by dividing the view field with a line crossing from a right edge of the view field to a left edge thereof.

79. A measuring apparatus according to claim 78, wherein the plurality of discriminating zones are defined by dividing the view field with a plurality of lines crossing from the right edge of the view field to the left edge thereof.

* * * * *

UNITED STATES PATENT AND TRADEMARK OFFICE
CERTIFICATE OF CORRECTION

PATENT NO. : 5,708,862  
DATED : January 13, 1998  
INVENTOR(S) : TOKUICHI TSUNEKAWA, ET AL.

It is certified that error appears in the above-indentified patent and that said Letters Patent is hereby corrected as shown below:

On the title page,

REFERENCES CITED

Item [56] U.S. PATENT DOCUMENTS

"Uedo et al." should read --Ueda et al.--.

COLUMN 5

Line 5, "extracts" should read --extracts,--.
Line 6, "later" should read --later,--.
Line 28, "passed" should read --passes--.
Line 35, "sensor 9" should read --sensor 9,--.

COLUMN 6

Line 64, "become e.g. 0." should read --become, e.g., 0.--.

COLUMN 7

Line 62, "receives" should read --receive--.

COLUMN 9

Line 44, "count" should read --counts--.

UNITED STATES PATENT AND TRADEMARK OFFICE
CERTIFICATE OF CORRECTION

PATENT NO. : 5,708,862  
DATED : January 13, 1998  
INVENTOR(S) : TOKUICHI TSUNEKAWA, ET AL.

It is certified that error appears in the above-identified patent and that said Letters Patent is hereby corrected as shown below:

COLUMN 10

Line 59, "claim 1" should read --claim 1,--.

COLUMN 13

Line 21, "discriminating" should read --of discriminating--.

COLUMN 14

Line 46, "claim 33," should read --claim 32,--.

COLUMN 15

Line 56, "at least one" should read --a--.

COLUMN 18

Line 8, "field of" should read --field to--.

Signed and Sealed this

Fourteenth Day of July, 1998

Attest:

BRUCE LEHMAN

*Attesting Officer*   *Commissioner of Patents and Trademarks*